US011345116B2

(12) United States Patent
Feys et al.

(10) Patent No.: US 11,345,116 B2
(45) Date of Patent: May 31, 2022

(54) MULTI-LAYERED SHEET SUITABLE AS FLOOR OR WALL COVERING EXHIBITING A THREE-DIMENSIONAL RELIEF AND A DECORATIVE IMAGE

(71) Applicant: BEAULIEU INTERNATIONAL GROUP NV, Waregem (BE)

(72) Inventors: Jonas Guido Feys, Mariakerke (BE); Pol Lombaert, Nazareth (BE); Leo Marie Richard Bevernage, Avegem (BE)

(73) Assignee: BEAULIEU INTERNATIONAL GROUP NV, Waregem (BE)

( * ) Notice: Subject to any disclaimer, the term of this patent is extended or adjusted under 35 U.S.C. 154(b) by 0 days.

(21) Appl. No.: 16/318,748

(22) PCT Filed: Jul. 18, 2017

(86) PCT No.: PCT/EP2017/068065
§ 371 (c)(1),
(2) Date: Jan. 18, 2019

(87) PCT Pub. No.: WO2018/015357
PCT Pub. Date: Jan. 25, 2018

(65) Prior Publication Data
US 2019/0275761 A1    Sep. 12, 2019

(30) Foreign Application Priority Data

Jul. 18, 2016  (EP) .................................... 16180040

(51) Int. Cl.
*B32B 3/30* (2006.01)
*B32B 5/14* (2006.01)
(Continued)

(52) U.S. Cl.
CPC ................ *B32B 3/30* (2013.01); *B32B 5/142* (2013.01); *B32B 5/147* (2013.01); *B32B 5/18* (2013.01);
(Continued)

(58) Field of Classification Search
None
See application file for complete search history.

(56) References Cited

U.S. PATENT DOCUMENTS 3,293,094 A * 12/1966 Frank ....................... C08J 9/101
156/79
3,293,108 A * 12/1966 Frank ....................... C08J 9/101
428/159
(Continued)

FOREIGN PATENT DOCUMENTS

CA         1195791 A     10/1985
CA         1195791 A1 *  10/1985
(Continued)

OTHER PUBLICATIONS

Machine Translation of JP-11277866-A, Oct. 1999 (Year: 1999).*
(Continued)

*Primary Examiner* — Jeffrey A Vonch
(74) *Attorney, Agent, or Firm* — Harness, Dickey & Pierce, P.L.C.

(57) ABSTRACT

The present invention relates to a multi-layered sheet suitable as floor or wall covering exhibiting a three-dimensional surface relief and a decorative image, comprising: i. a support layer having an upper surface and a lower surface; ii. a foamed layer having an upper surface and a lower surface, the lower surface of the foamed layer provided adjacent, and adherent to the upper surface of the support layer, the upper surface of the foamed layer comprising a discontinuous chemically embossed relief pattern, wherein
(Continued)

Figure 1:
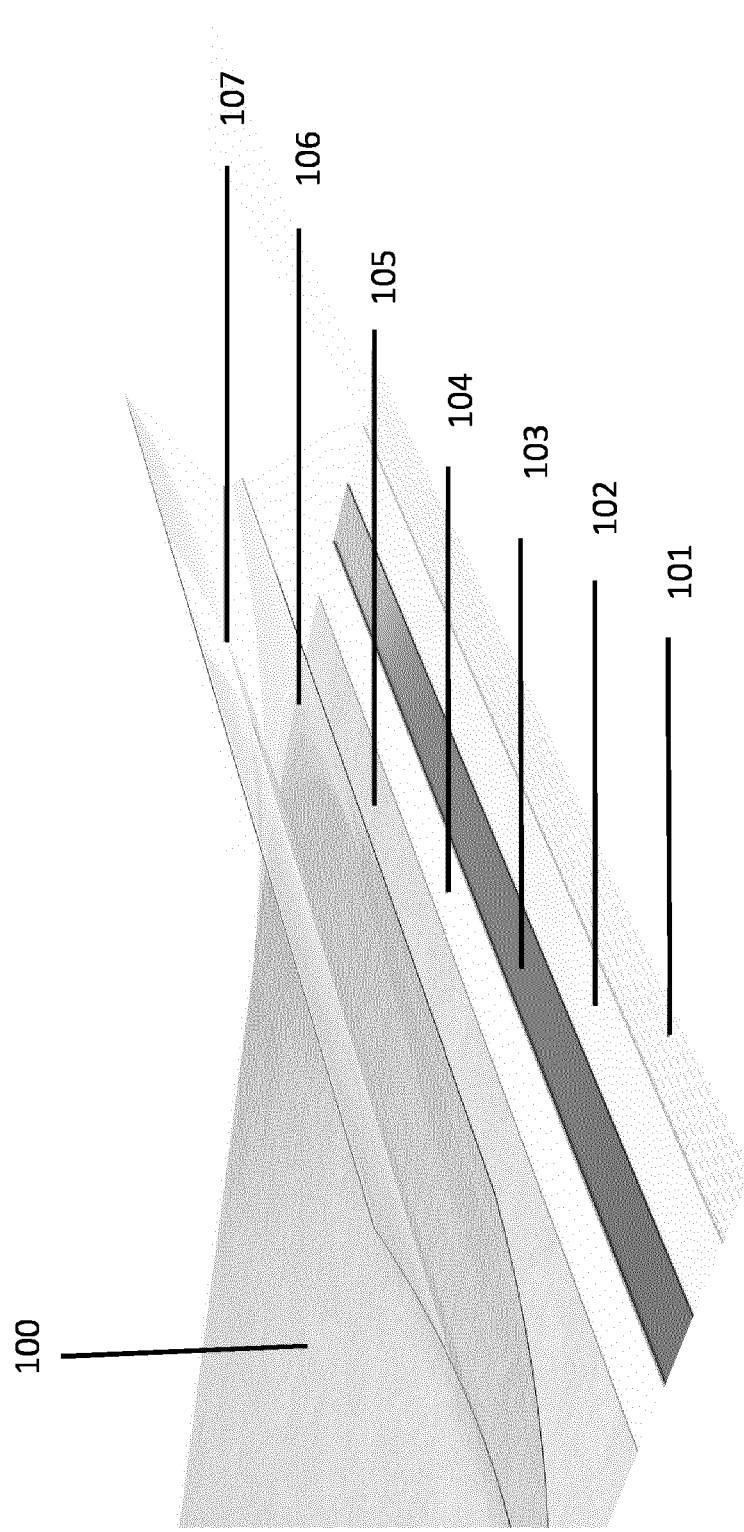

the discontinuous chemically embossed relief pattern comprises indentations formed by single or stacked dots of a digitally printed material comprising a foam inhibiting agent; and optionally iii. a decorative layer adhered to the upper surface of the foamed layer; and optionally iv. at least one wear resistant layer provided adjacent and adhered to the decorative layer; and optionally v. a backing layer provided adjacent and adhered to the lower surface of the support layer.

28 Claims, 7 Drawing Sheets

(51) Int. Cl.
| | | |
|---|---|---|
| B32B 5/20 | (2006.01) | |
| B32B 5/24 | (2006.01) | |
| B32B 27/06 | (2006.01) | |
| B41M 5/00 | (2006.01) | |
| B41M 7/00 | (2006.01) | |
| B44C 1/20 | (2006.01) | |
| D06N 7/04 | (2006.01) | |
| E04F 15/10 | (2006.01) | |
| E04F 15/16 | (2006.01) | |
| B41J 3/407 | (2006.01) | |
| B32B 5/18 | (2006.01) | |
| B32B 5/22 | (2006.01) | |
| D06N 7/00 | (2006.01) | |
| B32B 38/00 | (2006.01) | |
| C09D 11/03 | (2014.01) | |
| B41J 2/145 | (2006.01) | |
| B41J 2/21 | (2006.01) | |
| B41J 3/44 | (2006.01) | |
| B41M 3/18 | (2006.01) | |
| E04F 13/077 | (2006.01) | |
| E04F 13/08 | (2006.01) | |
| E04F 13/18 | (2006.01) | |
| B32B 5/02 | (2006.01) | |
| B32B 5/28 | (2006.01) | |
| B32B 27/30 | (2006.01) | |
| E04F 13/00 | (2006.01) | |
| B32B 37/24 | (2006.01) | |
| B32B 38/06 | (2006.01) | |
| B41J 11/00 | (2006.01) | |

(52) U.S. Cl.
CPC .................. *B32B 5/20* (2013.01); *B32B 5/22* (2013.01); *B32B 5/245* (2013.01); *B32B 38/145* (2013.01); *B41J 3/407* (2013.01); *B41M 5/0023* (2013.01); *B41M 5/0041* (2013.01); *B41M 7/0081* (2013.01); *D06N 7/006* (2013.01); *D06N 7/0015* (2013.01); *E04F 15/105* (2013.01); *E04F 15/107* (2013.01); *E04F 15/163* (2013.01); *B32B 5/022* (2013.01); *B32B 5/024* (2013.01); *B32B 5/28* (2013.01); *B32B 27/065* (2013.01); *B32B 27/304* (2013.01); *B32B 38/0032* (2013.01); *B32B 38/06* (2013.01); *B32B 2037/243* (2013.01); *B32B 2255/102* (2013.01); *B32B 2255/24* (2013.01); *B32B 2255/26* (2013.01); *B32B 2255/28* (2013.01); *B32B 2260/021* (2013.01); *B32B 2260/046* (2013.01); *B32B 2262/101* (2013.01); *B32B 2266/0228* (2013.01); *B32B 2266/0235* (2013.01); *B32B 2305/022* (2013.01); *B32B 2305/07* (2013.01); *B32B 2305/08* (2013.01); *B32B 2305/72* (2013.01); *B32B 2307/4023* (2013.01); *B32B 2307/412* (2013.01); *B32B 2307/538* (2013.01); *B32B 2307/554* (2013.01); *B32B 2307/75* (2013.01); *B32B 2310/0831* (2013.01); *B32B 2327/06* (2013.01); *B32B 2451/00* (2013.01); *B32B 2471/00* (2013.01); *B32B 2607/00* (2013.01); *B32B 2607/02* (2013.01); *B41J 2/145* (2013.01); *B41J 2/2107* (2013.01); *B41J 2/2132* (2013.01); *B41J 3/445* (2013.01); *B41J 11/00214* (2021.01); *B41M 3/18* (2013.01); *B41M 5/0047* (2013.01); *B41M 7/009* (2013.01); *B41M 7/0045* (2013.01); *B44C 1/205* (2013.01); *C09D 11/03* (2013.01); *D06N 7/0036* (2013.01); *D06N 2203/048* (2013.01); *D06N 2205/04* (2013.01); *D06N 2205/20* (2013.01); *D06N 2207/123* (2013.01); *D06N 2209/0861* (2013.01); *D06N 2209/105* (2013.01); *D06N 2209/1685* (2013.01); *D06N 2211/063* (2013.01); *D06N 2211/066* (2013.01); *D06N 2213/03* (2013.01); *E04F 13/002* (2013.01); *E04F 13/077* (2013.01); *E04F 13/0871* (2013.01); *E04F 13/18* (2013.01); *Y10S 428/9044* (2013.01); *Y10T 428/24504* (2015.01); *Y10T 428/24521* (2015.01); *Y10T 428/24595* (2015.01); *Y10T 428/24802* (2015.01); *Y10T 428/24851* (2015.01); *Y10T 428/24868* (2015.01)

(56) References Cited

U.S. PATENT DOCUMENTS

| | | | | |
|---|---|---|---|---|
| 3,365,353 A | * | 1/1968 | Witman | D06N 7/0013 428/159 |
| 3,373,072 A | * | 3/1968 | Jones | B32B 27/00 428/159 |
| 3,399,106 A | * | 8/1968 | Palmer | D06N 7/0018 428/159 |
| 3,428,471 A | * | 2/1969 | Tuthill | C08J 9/101 427/259 |
| 3,519,527 A | * | 7/1970 | Crowley | D06N 3/0088 428/159 |
| 3,660,187 A | * | 5/1972 | Shortway | D06N 7/0028 156/79 |
| 3,775,237 A | * | 11/1973 | Crowley | B32B 5/245 428/158 |
| 3,844,814 A | * | 10/1974 | Bettoli | D06N 7/0013 427/270 |
| 3,914,485 A | * | 10/1975 | Curtis | D06N 7/0013 428/71 |
| 3,949,028 A | * | 4/1976 | Murakami | B29C 59/16 264/419 |
| 3,958,043 A | * | 5/1976 | McKee, Jr. | B41M 3/008 427/195 |
| 3,958,054 A | * | 5/1976 | McKee, Jr. | B41M 3/008 428/172 |
| 4,012,248 A | * | 3/1977 | Rump | B32B 5/18 156/79 |
| 4,138,521 A | * | 2/1979 | Brown | B32B 5/022 428/159 |
| 4,187,338 A | * | 2/1980 | Miura | C08J 9/0061 264/52 |
| 4,198,448 A | * | 4/1980 | Kauffman | B44C 1/205 427/244 |
| 4,244,899 A | * | 1/1981 | Henshaw | B32B 5/20 264/45.1 |
| 4,248,922 A | * | 2/1981 | Shortway | B32B 5/20 428/159 |
| 4,273,819 A | * | 6/1981 | Schmidle | B32B 5/20 428/159 |
| 4,407,882 A | * | 10/1983 | Hauser | C09D 11/03 106/31.78 |

(56) References Cited

U.S. PATENT DOCUMENTS

| | | | | |
|---|---|---|---|---|
| 4,588,545 A * | 5/1986 | Kauffman | ............... | B29C 59/18 264/46.4 |
| 4,608,294 A * | 8/1986 | Courtoy | ............... | B44C 1/205 428/141 |
| 4,698,258 A * | 10/1987 | Harkins, Jr. | ............... | B32B 5/24 442/373 |
| 4,748,453 A * | 5/1988 | Lin | ............... | B41J 2/2132 347/105 |
| 4,999,646 A * | 3/1991 | Trask | ............... | B41J 2/2132 347/41 |
| 5,140,339 A * | 8/1992 | Higuma | ............... | B41M 5/52 347/105 |
| 5,252,986 A * | 10/1993 | Takaoka | ............... | H04N 1/4057 347/15 |
| 5,256,465 A * | 10/1993 | Martin | ............... | B29C 44/60 428/158 |
| 5,336,693 A * | 8/1994 | Frisch | ............... | B41M 1/30 106/31.43 |
| 5,458,953 A * | 10/1995 | Wang | ............... | B05D 7/54 428/195.1 |
| 5,578,363 A * | 11/1996 | Finley | ............... | B32B 5/22 428/194 |
| 5,583,550 A * | 12/1996 | Hickman | ............... | B41J 2/2054 347/41 |
| 5,728,332 A * | 3/1998 | Frisch | ............... | B05D 3/107 264/46.4 |
| 5,733,630 A * | 3/1998 | Frisch | ............... | B05D 3/107 428/159 |
| 5,961,903 A * | 10/1999 | Eby | ............... | B29C 44/06 156/79 |
| 5,964,149 A * | 10/1999 | Venneri | ............... | H04N 1/506 101/211 |
| 6,114,008 A * | 9/2000 | Eby | ............... | B29C 44/06 428/151 |
| 6,117,608 A * | 9/2000 | Aoyagi | ............... | G03G 9/12 430/115 |
| 6,140,379 A * | 10/2000 | Yang | ............... | C08J 9/101 521/85 |
| 6,155,670 A * | 12/2000 | Weber | ............... | B41J 2/1404 347/43 |
| 6,193,347 B1 * | 2/2001 | Askeland | ............... | B41J 2/04505 347/15 |
| 6,228,463 B1 * | 5/2001 | Chen | ............... | B05D 7/54 428/158 |
| 6,312,096 B1 * | 11/2001 | Koitabashi | ............... | B41J 2/04518 347/40 |
| 6,409,333 B1 * | 6/2002 | Nishikawa | ............... | B41M 3/18 347/100 |
| 6,426,123 B1 * | 7/2002 | Aoyagi | ............... | G03G 9/12 427/243 |
| 6,555,216 B2 * | 4/2003 | Chen | ............... | B05D 7/54 428/322.7 |
| 6,753,066 B2 * | 6/2004 | Eby | ............... | B29C 44/06 428/159 |
| 9,862,849 B1 * | 1/2018 | Sloan | ............... | C09D 11/101 |
| 2001/0002293 A1 * | 5/2001 | Eby | ............... | D06N 7/0015 428/158 |
| 2001/0038910 A1 * | 11/2001 | MacQueen | ............... | C08J 3/244 428/327 |
| 2002/0060717 A1 * | 5/2002 | Weijkamp | ............... | B41J 2/2132 347/43 |
| 2002/0114927 A1 * | 8/2002 | Brossman | ............... | B29C 44/04 428/158 |
| 2003/0021955 A1 * | 1/2003 | Brossman | ............... | B29C 44/5636 428/158 |
| 2003/0072919 A1 * | 4/2003 | Watts, Jr. | ............... | B32B 3/00 428/159 |
| 2003/0138617 A1 * | 7/2003 | Courtoy | ............... | B29C 59/16 428/304.4 |
| 2003/0138618 A1 * | 7/2003 | Courtoy | ............... | B29C 59/16 428/308.4 |
| 2003/0180636 A1 * | 9/2003 | Kanga | ............... | B41C 1/05 430/18 |
| 2004/0086678 A1 * | 5/2004 | Chen | ............... | B44C 5/0461 428/44 |
| 2004/0099170 A1 * | 5/2004 | Takabayashi | ............... | C09D 11/101 101/491 |
| 2004/0241416 A1 * | 12/2004 | Tian | ............... | D06N 7/0092 428/304.4 |
| 2005/0158101 A1 * | 7/2005 | Silverbrook | ............... | G07F 17/26 400/62 |
| 2006/0159891 A1 * | 7/2006 | Viet | ............... | B32B 5/20 428/172 |
| 2007/0169656 A1 * | 7/2007 | Armitage | ............... | G06T 11/60 101/483 |
| 2008/0092773 A1 * | 4/2008 | Matsuyama | ............... | C09C 3/063 106/31.65 |
| 2008/0180475 A1 * | 7/2008 | Eldar | ............... | H04N 1/405 347/13 |
| 2008/0211866 A1 * | 9/2008 | Hill | ............... | B41M 3/008 347/42 |
| 2009/0162621 A1 * | 6/2009 | Craamer | ............... | D06M 10/005 428/196 |
| 2010/0075152 A1 * | 3/2010 | Forget | ............... | B44C 1/10 428/424.8 |
| 2010/0092688 A1 * | 4/2010 | Serbutoviez | ............... | B29B 13/023 427/510 |
| 2010/0101716 A1 * | 4/2010 | Roof | ............... | B41J 11/00214 156/247 |
| 2010/0182367 A1 * | 7/2010 | Takagi | ............... | B41J 2/2132 347/14 |
| 2011/0227973 A1 * | 9/2011 | Larson | ............... | B41J 2/2146 347/9 |
| 2012/0092414 A1 * | 4/2012 | Profaca | ............... | B41J 2/16505 347/32 |
| 2012/0113448 A1 * | 5/2012 | Moribe | ............... | H04N 1/4055 358/1.9 |
| 2012/0114931 A1 * | 5/2012 | Siche | ............... | C08J 7/043 428/317.9 |
| 2012/0171434 A1 * | 7/2012 | Herlihy | ............... | C09D 7/00 428/195.1 |
| 2013/0229478 A1 * | 9/2013 | Horiuchi | ............... | B41M 7/009 347/188 |
| 2013/0307913 A1 * | 11/2013 | Kawashima | ............... | B41J 2/2107 347/100 |
| 2014/0022291 A1 * | 1/2014 | Van Den Steen | ............... | B41J 3/445 347/2 |
| 2014/0023832 A1 * | 1/2014 | Pervan | ............... | E04F 15/10 428/173 |
| 2014/0110887 A1 * | 4/2014 | Horiuchi | ............... | B41J 11/00216 264/413 |
| 2016/0144612 A1 * | 5/2016 | Pervan | ............... | B05D 1/02 101/28 |
| 2016/0194138 A1 * | 7/2016 | Saitaka | ............... | B32B 27/08 229/403 |
| 2016/0207307 A1 * | 7/2016 | De Mondt | ............... | B41J 11/0015 |
| 2017/0028739 A1 * | 2/2017 | Ohnishi | ............... | B41J 2/2103 |
| 2017/0144427 A1 * | 5/2017 | Klackmann-Schneider | ............... | B41M 7/0081 |
| 2017/0232724 A1 * | 8/2017 | Bernardes Vieira Junior | ............... | B32B 27/322 428/141 |
| 2018/0163413 A1 * | 6/2018 | Odum | ............... | B32B 23/08 |
| 2018/0169914 A1 * | 6/2018 | Ball | ............... | B29C 44/12 |

FOREIGN PATENT DOCUMENTS

| | | | |
|---|---|---|---|
| CA | 2332142 A1 * | 7/2001 | |
| CN | 102677867 A * | 9/2012 | ......... B41M 5/0064 |
| DE | 19912160 A1 * | 9/2000 | ............ G03H 1/30 |
| DE | 20319355 U1 * | 5/2004 | ............. B41J 3/28 |
| DE | 102008013057 A1 * | 10/2008 | ............ B41M 1/24 |
| EP | 0003965 A1 * | 9/1979 | ............ D06N 3/06 |
| EP | 1228813 A2 | 8/2002 | |
| EP | 1493861 A1 | 1/2005 | |
| EP | 1681388 A2 * | 7/2006 | ............ D06N 3/08 |
| EP | 1998273 A1 * | 12/2008 | ......... G06K 15/107 |

(56) References Cited

FOREIGN PATENT DOCUMENTS

| | | | | | |
|---|---|---|---|---|---|
| FR | 2831563 | A1 | * | 5/2003 | ............ D06N 3/06 |
| FR | 3010428 | A1 | * | 3/2015 | ............ B32B 27/40 |
| JP | 50025674 | A | * | 3/1975 | ............ D06N 3/06 |
| JP | 55028855 | A | * | 2/1980 | ............ B32B 7/12 |
| JP | 55069426 | A | * | 5/1980 | |
| JP | 55069427 | A | * | 5/1980 | ......... B41M 5/0064 |
| JP | 62086030 | A | * | 4/1987 | |
| JP | 63033430 | A | * | 2/1988 | |
| JP | 01110123 | A | * | 4/1989 | |
| JP | 03231859 | A | * | 10/1991 | |
| JP | 08244060 | A | * | 9/1996 | |
| JP | 10076587 | A | * | 3/1998 | |
| JP | 11058659 | A | * | 3/1999 | ............ G03H 1/30 |
| JP | 11277866 | A | * | 10/1999 | |
| JP | H11277866 | A | | 10/1999 | |
| JP | 11344841 | A | * | 12/1999 | ............ G03H 1/30 |
| JP | 2000122350 | A | * | 4/2000 | |
| JP | 2002200717 | A | * | 7/2002 | ............ D06N 3/06 |
| JP | 2003019728 | A | * | 1/2003 | |
| JP | 2004034618 | A | * | 2/2004 | |
| JP | 2004353233 | A | * | 12/2004 | ......... B41M 5/0064 |
| JP | 2006272804 | A | * | 10/2006 | ............ G06K 15/107 |
| JP | 2007007972 | A | * | 1/2007 | ............ D06N 3/06 |
| JP | 2010255169 | A | * | 11/2010 | |
| JP | 2014131833 | A | * | 7/2014 | ............ B32B 7/12 |
| JP | 2016064515 | A | * | 4/2016 | ............ D21H 27/02 |
| NL | 1029194 | C1 | * | 12/2006 | ............ E04F 15/02 |
| SU | 1754467 | A1 | * | 8/1992 | |
| WO | WO-2007114715 | A1 | * | 10/2007 | ......... B41M 5/0064 |
| WO | WO-2011064075 | A2 | * | 6/2011 | ............ B41M 3/06 |
| WO | WO-2014068014 | A1 | * | 5/2014 | ............ C08J 5/128 |
| WO | WO-2017017224 | A1 | * | 2/2017 | ............ D21H 27/02 |
| WO | WO-2017017226 | A1 | * | 2/2017 | ............ B41M 3/18 |

OTHER PUBLICATIONS

OKI Printing Solutions, OKI's Technology Guide to Inkjet Printing, Aug. 2009 (Year: 2009).*
Machine Translation of CA 1195791 A, Oct. 1985 (Year: 1985).*
Machine Translation of JP-03231859-A, Oct. 1991 (Year: 1991).*
Machine Translation of JP-2002200717-A, Jul. 2002 (Year: 2002).*
Machine Translation of JP-2010255169-A, Nov. 2010 (Year: 2010).*
Machine Translation of NL1029194 C1, Dec. 2006 (Year: 2006).*
International Search Report from corresponding PCT Application No. PCT/EP2017/068065, dated Sep. 6, 2017.
Written Opinion of the International Searching Authority from corresponding PCT Application No. PCT/EP2017/068065, dated Sep. 6, 2017.

* cited by examiner

MULTI-LAYERED SHEET SUITABLE AS FLOOR OR WALL COVERING EXHIBITING A THREE-DIMENSIONAL RELIEF AND A DECORATIVE IMAGE

CROSS-REFERENCE TO RELATED APPLICATIONS

This application is a national phase application of PCT Application No. PCT/EP2017/068065, filed on 18 Jul. 2017, which claims priority to European Patent Application No. 16180040.4, filed on 18 Jul. 2016. The entire disclosure of the applications identified in this paragraph is incorporated herein by references.

FIELD OF THE INVENTION

The present invention relates to a multi-layered sheet suitable as floor or wall covering exhibiting a three-dimensional relief and a decorative image, to a multi-layered sheet-like substrate suitable for being processed into said sheet, to a process for their manufacture, and to a system for performing said process.

BACKGROUND OF THE INVENTION

Traditionally, foamed vinyl floorings such as sheet vinyl are produced using rotogravure printing for the deposition of an image or design on the visible surface thereof, and using rolls bearing patterns for mechanically embossing and/or using foam inhibitor for chemical embossing of the surface of the sheet vinyl.

Chemical embossing typically employs foaming inhibitor compounds, whereby selected areas of the surface of a foamable polymeric layer are printed with one or more ink compositions containing an agent that inhibits foaming when the material is subjected to a heat treatment. The foamable material is expanding fully in areas where no inhibitor is deposited, and foaming is reduced in areas with inhibitor, thereby creating a foamed layer having a surface with indentations at those areas where the foam inhibitor was applied, as for instance disclosed in U.S. Pat. No. 3,293,108 or 3,844,814.

However, independently from whether physical and/or chemical embossing is employed, this always requires the use of rolls with predetermined patterns. As a result, the embossed and printed patterns are repeated with every revolution of the roll, effectively limiting the variation of the pattern to the circumference of these rolls. Typically, two or more rolls are used consecutively to build up an image which poses the issue that respective designs and emboss patterns may not be in register if a roll is even slightly moved or misplaced and/or offset during the process, resulting in a rather large potential for error. A further issue resides in the fact that designs and emboss patterns cannot be changed easily, as such a change would require a different roll for each design/emboss pattern. Such rolls are extremely expensive, and interchanging rolls takes a lot of time (1 up to several hours, per roll).

Accordingly, this process so far has been limited to large production runs of sheet vinyl with repetitive designs.

SUMMARY OF THE INVENTION

In a first aspect, the present invention relates to a multi-layered sheet suitable as floor or wall covering exhibiting a three-dimensional surface relief and a decorative image, comprising:

i. a support layer having an upper surface and a lower surface;
ii. a foamed layer having an upper surface and a lower surface, the lower surface of the foamed layer provided adjacent, and adherent to the upper surface of the support layer, the upper surface of the foamed layer comprising a discontinuous chemically embossed relief pattern, wherein the discontinuous chemically embossed relief pattern comprises indentations formed by single or stacked dots of a digitally printed material comprising a foam inhibiting agent; and optionally,
iii. a decorative layer adhered to the upper surface of the foamed layer; and optionally
iv. at least one wear resistant layer provided adjacent and adhered to the decorative layer; and optionally
v. a backing layer provided adjacent and adhered to the lower surface of the support layer.

In a second aspect, the present invention relates to a multi-layered sheet-like substrate suitable for being processed into a multi-layered sheet according to the first aspect, comprising i. a support layer having an upper surface and a lower surface,
ii. a foamable layer having an upper surface and a lower surface, the lower surface of the foamable layer provided adjacent, and adherent to the upper surface of the support layer; and
iii. a discontinuous chemical embossing pattern comprising single or stacked dots of a digitally printed material comprising a foam inhibiting agent provided on the upper surface of the foamable layer, and optionally,
iv. a decorative layer adhered to the upper surface of the foamable layer.

In a third aspect, the present invention relates to a floor or wall panel comprising:

i. a base panel; and
ii. the multi-layered sheet of the first aspect as a top layer adjacent and adhered to the base panel.

In a fourth aspect, the present invention relates to a process of preparing the substrate or the sheet according to the first or second aspects, comprising the steps of:

i. providing a support layer having an upper surface and a lower surface; and
ii. adhering a foamable layer to the upper surface of the support layer; and
iii. applying a discontinuous chemical embossing pattern comprising single or stacked dots of a digitally printed material comprising a foam inhibiting agent on the upper surface of the foamable layer, and optionally,
iv. applying a decorative layer to the upper surface of the foamable layer comprising the chemical embossing pattern.

In a fifth aspect, the present invention also relates to a system for use in the process of the fourth aspect, comprising:

i. a server;
ii. a database, operatively connected to the server and configured to store one or more patterns for deposition of a foam inhibitor agent to form a chemically embossed relief pattern;
iii. a module, operatively connected to the server, for uploading one or more customized patterns and for storing the patterns in the database; and
iv. a digital printer, operatively connected to the server, configured to print the one or more customized pattern(s) for the chemical embossing of the foamable layer.

SHORT DESCRIPTION OF THE FIGURES

The present invention now is described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

FIG. 1 discloses an exploded, schematic, view of a sheet according to a preferred embodiment of the present invention.

FIGS. 2A and 2B disclose cutaway drawings of an example embodiment of the layers that may comprise a foamable substrate (2A), and a foamed sheet (2B) as described herein.

Figure 3:
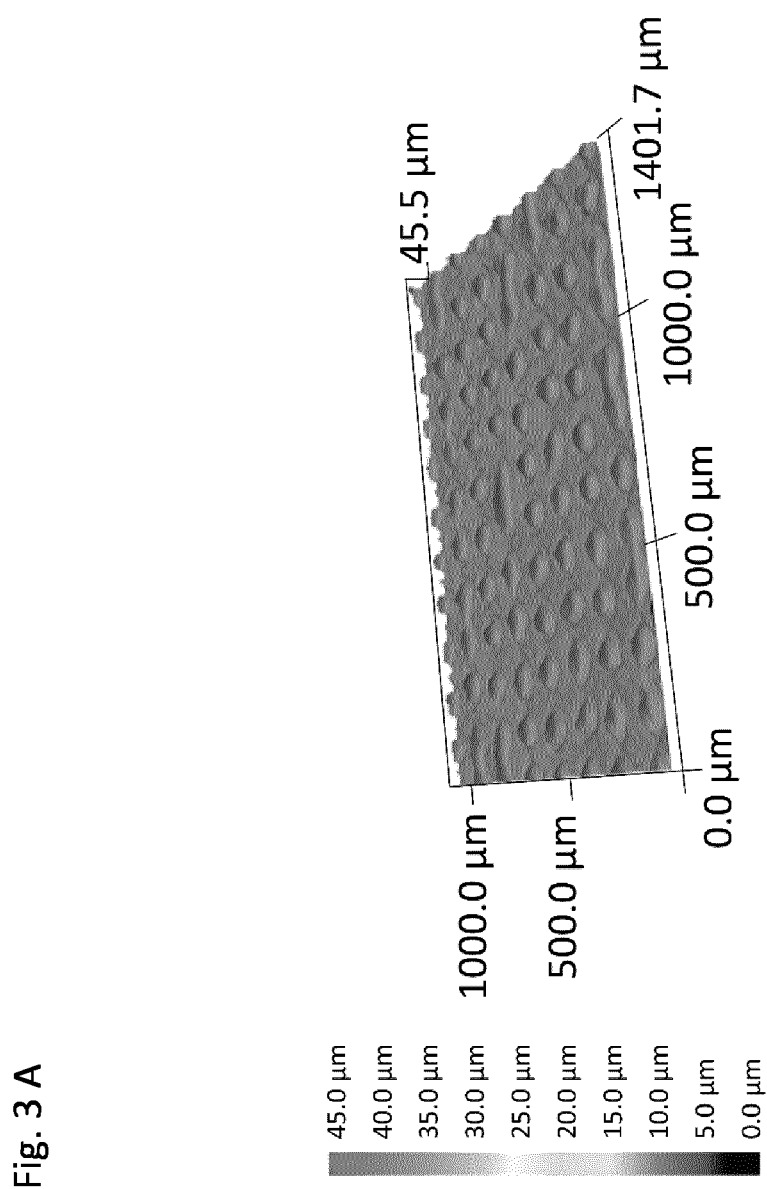
Figure 3:
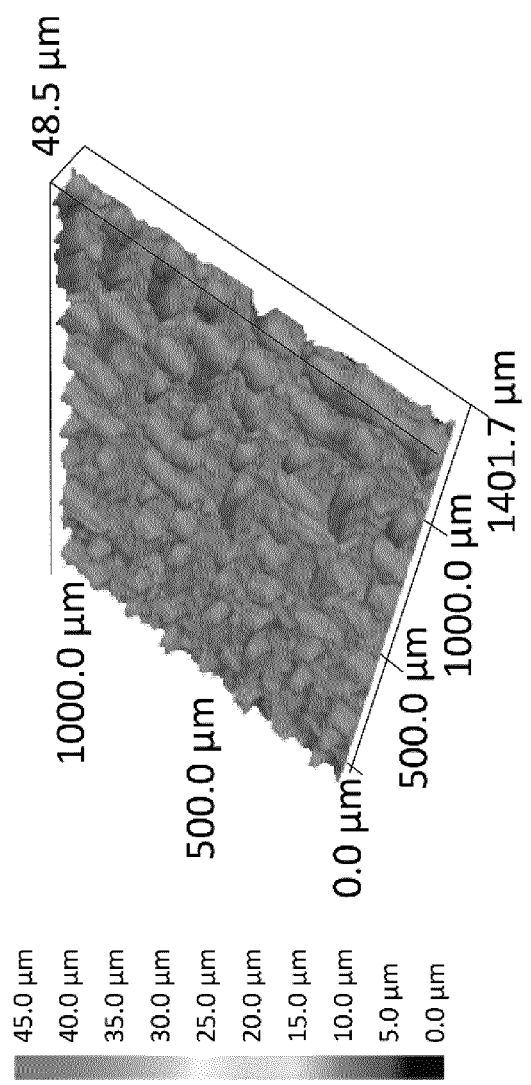
Figure 3C:
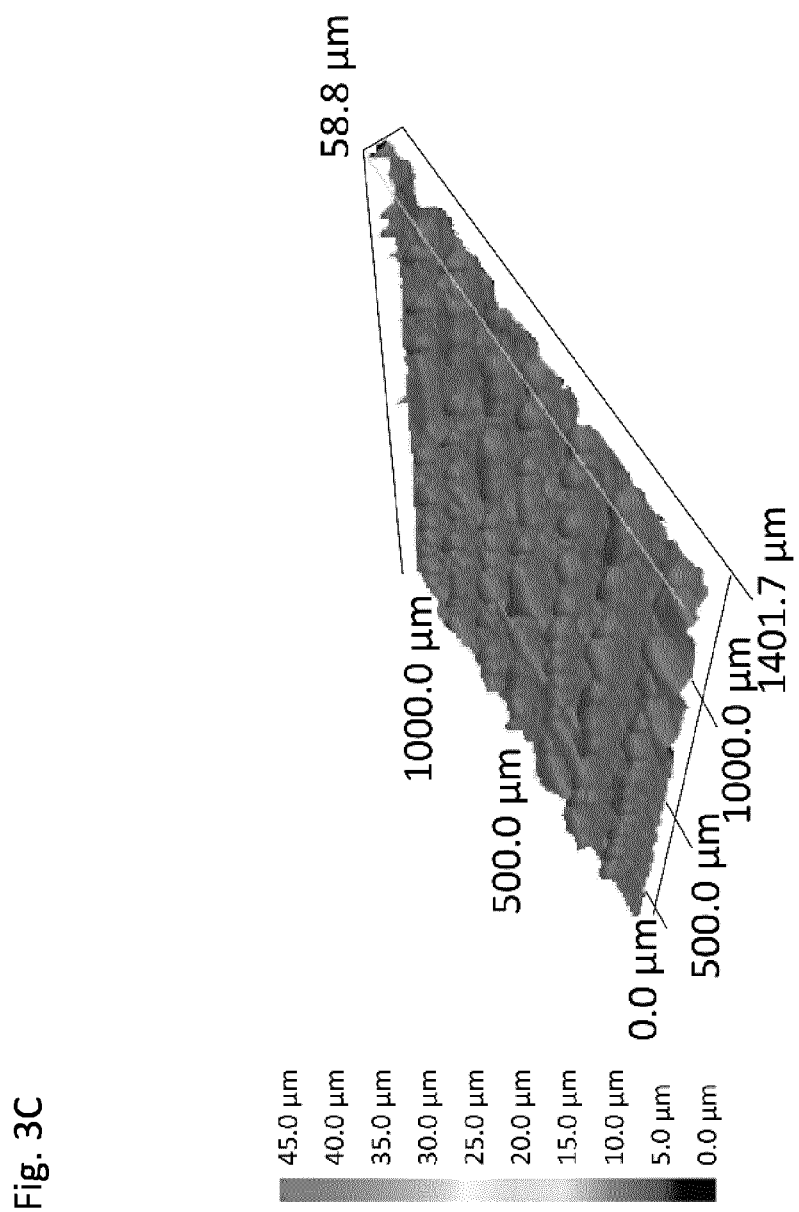
Figure 3D:
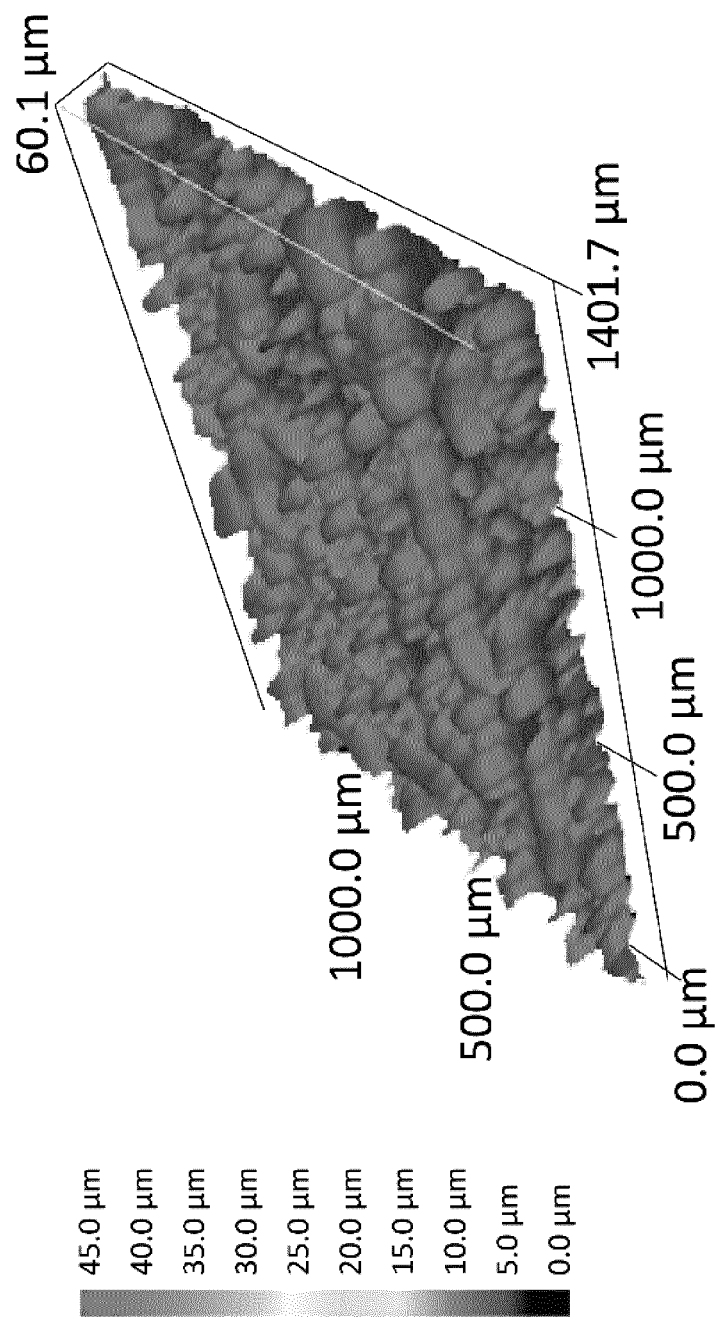

FIG. 3 discloses an optical profilometry of a layer comprising single (A) or stacked dots (B-D equaling 2, 4 and 8 passes, respectively) of a digitally printed inhibitor material, prior to foam expansion.

DETAILED DESCRIPTION OF THE INVENTION

In a first aspect, the present invention relates to a multi-layered sheet suitable as floor or wall covering exhibiting a three-dimensional surface relief and a decorative image, comprising:
  i. a support layer having an upper surface and a lower surface;
  ii. a foamed layer having an upper surface and a lower surface, the lower surface of the foamed layer provided adjacent, and adherent to the upper surface of the support layer, the upper surface of the foamed layer comprising a discontinuous chemically embossed relief pattern, wherein the discontinuous chemically embossed relief pattern comprises indentations formed by single or stacked dots of a digitally printed material comprising a foam inhibiting agent; and
  iii. a decorative layer adhered to the upper surface of the foamed layer; and optionally
  iv. at least one wear resistant layer provided adjacent and adhered to the decorative layer; and optionally
  v. a backing layer provided adjacent and adhered to the lower surface of the support layer.

FIG. 1 shows an exploded view of a preferred multi-layered sheet: from bottom to top, this shows a backing layer (101), a support layer with: a reinforcement layer (102) and an impregnation material (103); a foamed layer (104) comprising the chemical embossing pattern; a decorative layer (105), a wear resistant layer (106) and an optional top coat or lacquer (107).

In a second aspect, the present invention relates to a multi-layered sheet-like substrate suitable for being processed into a multi-layered sheet according to claim 1, comprising
  i. a support layer having an upper surface and a lower surface,
  ii. a foamable layer having an upper surface and a lower surface, the lower surface of the foamable layer provided adjacent, and adherent to the upper surface of the support layer; and
  iii. a discontinuous chemical embossing pattern comprising single or stacked dots of a digitally printed material comprising a foam inhibiting agent provided on the upper surface of the foamable layer, and optionally,
  iv. a decorative layer adhered to the upper surface of the foamable layer.

This multi-layered sheet-like substrate is an intermediate product which can be processed into a final product such as the multi-layered sheet.

Support Layer:

The support layer has an upper and a lower surface. It preferably comprises at least one reinforcement layer (102), impregnated with a impregnation material (103).

The reinforcement layer (102) can be a woven or non-woven layer, preferably a glass fibre cloth or glass fibre fleece. The reinforcement layer is preferably impregnated with a synthetic material.

The term "synthetic material" as used in the context of the current invention, can be a single polymer or a blend of two or more polymers. The synthetic material can be, for example, a thermoplastic polymer, a thermosetting polymer, a rubber, an elastomer, or any combinations thereof. Further, the synthetic material can be any type of polymer, such as a homopolymer, a copolymer, a random polymer, alternating polymer, graft polymer, block polymer, star-like polymer, comb-like polymer, cross-linked polymer, and/or vulcanized polymer. The synthetic material may comprise one or more polymer blends. The synthetic material may preferably comprise a thermoplastic elastomer (TPE), an interpenetrating polymer network (IPN); simultaneous interpenetrating polymer network (SIN); or interpenetrating elastomeric network (IEN). The synthetic material may also include mixtures of synthetic polymers and natural polymers. In one particular example, the synthetic material is a thermoplastic polymer that includes vinyl containing thermoplastics such as polyvinyl chloride, polyvinyl acetate, polyvinyl alcohol, polyvinyl butyral and other vinyl and vinylidene resins and copolymers thereof; polyethylenes such as low density polyethylenes and high density polyethylenes and copolymers thereof; styrenes such as ABS, SAN, and polystyrenes and copolymers thereof, polypropylene and copolymers thereof; saturated and unsaturated polyesters; acrylics; polyamides such as nylon containing types; engineering plastics such as polycarbonate, polyimide, polysulfone, and polyphenylene oxide and sulfide resins and the like. In a preferred embodiment, the synthetic material is polyvinyl chloride (PVC), and more preferably plasticized PVC.

Foamable Layer (202) and Foamed Layer (104):

A foamable layer is provided adjacent, and adherent to the upper surface of the support layer. The foamable layer comprises a foamable synthetic material, which is capable of expanding upon thermal treatment.

This expansion may advantageously be achieved by incorporating one or more blowing agent(s) into the foamable layer, and by allowing the foam to expand. The use of blowing agents as well as inhibitors to create flexible PVC foams with support is well known, see for instance Ullmann's Polymers and Plastics, 4 Volume Set: Products and Processes, p. 1578, Wiley-VCH Verlag, Weinheim, 2016. Generally, blowing agents used herein are solids that are dispersed throughout the polymer and generate gas by chemical decomposition, resulting in the formation of gas-filled cells throughout the polymer. The cells result in the formation of a sponge or foam structure that has a lower bulk density than the solid polymer. Blowing agents that generate gas after their incorporation into the polymer are termed "in situ" blowing agents, and function by chemical decomposition of the blowing agent under the conditions of a so-called blowing step. An advantage of in situ blowing agents is that they are triggered selectively, whereby a foam is formed. Chemical blowing agents are typically solids which decompose at elevated temperatures, wherein a gas is formed, thereby driving the expansion of the foamable layer to a foamed layer. Inorganic blowing agents may be employed, such as ammonium hydrogen carbonate, or organic blowing agents such as p-toluenesulfonhydrazide, 4,4'-oxybis-(benzenesulfonhydrazide), N,N'-dinitrosopentamethylenetetramine, or azodicarbonamide.

Organic blowing agents provide a number of advantages over previously used inorganic blowing agents such as ammonium hydrogen carbonate, as they allow easier dispersion in the polymer formulation, provide higher gas yields, decompose within a narrower temperature range and are sufficiently stable upon storage. Also, their decomposition temperature can be lowered below the working temperature by activation through the use of active kickers. Through deactivation of the kicker by inhibiting agents, the decomposition temperature of the blowing agent-kicker mixture increases to a value above the working temperature. Preferably, the foamable compositions employed herein comprises a nitrogen containing chemical blowing agent. The blowing agents which have found the most wide-spread use are those compounds having N—N bonds which decompose at elevated temperature to yield an inert gas high in nitrogen, also referred to as "nitrogen containing blowing agents". Nitrogen has a low permeability in polymers, which is highly desirable to prepare for instance closed cell foam layers. A particularly useful nitrogen containing blowing agent for polymers is azodicarbonamide. Thermal decomposition of azodicarbonamide results in the evolution of nitrogen, carbon monoxide, carbon dioxide, and ammonia gases, which are trapped in the polymer as bubbles to form a foamed article. While azodicarbonamide can be used neat, it preferably is modified to affect the decomposition temperature range. Generally, blowing agent decomposition is a function of chemical activation, particle size and temperature. Accordingly, it is common practice to add kickers into the compositions to reduce the decomposition temperature and/or to narrow the decomposition temperature range. While azodicarbonamide generally starts to decompose at 200° C., addition of a kicker, such as zinc oxide, allows to reduce the decomposition temperature to the range of from 160° C. to 195° C. Useful blowing agent kickers include, but are not limited to citric acid, oxalic acid, p-toluene sulfonic acid, phosphoric acid, potassium carbonate, borax, triethanol amine, zinc chloride, zinc acetate, zinc oxide, zinc stearate, barium stearate, calcium stearate, urea and polyethylene glycol. Preferably, the at least one blowing kicker comprises zinc oxide, or zinc oxide and urea. The nitrogen containing blowing agent and at least one blowing agent kicker are preferably compounded together prior to being added to the polymer material. Highly kicked azodicarbonamide is preferred to produce chemically embossed foam. Azodicarbonamide, combined with a kicker, is a preferred blowing agent in the formation of foamable material, in particular in materials comprising polyvinyl chloride (PVC), specifically plasticized PVC, as it can be incorporated easily into the polymer material. Upon decomposition, it then forms gas bubbles. The substrate preferably substantially is composed of a thermoplastic material, preferably a soft thermoplastic material.

Plasticized, i.e. soft PVC foam is particularly useful as flooring or wall covering material due to its resilience, and high friction coefficient on smooth surfaces. The preferred kicker for this invention are zinc oxide and/or urea. The quantity of the kicker is generally from about 10% to 70% by weight of the azodicarbonamide, preferably from 20% to 50% and most preferably from about 35% to 45%. Since the particle size is also relevant for the speed and release of gas, as well as the size of the foam cells thus formed, the nitrogen containing blowing agent and at least one blowing agent kicker preferably have an average particle size of less than 5 µm, more preferably less than 4 µm as measured by a laser particle size measuring device. The blowing agent is preferably uniformly dispersed in the foamable layer.

While the support layer primarily provides mechanical strength and dimensional stability, the foamed layer primarily provides optimized flexibility and acoustic characteristics. These characteristics are important to a variety of covering panel products such as floor or wall covering materials. Hence, the foamed layer preferably is a "resilient" layer referring to the ability of a material of at least partially regaining its original shape or position after bending, stretching, compression, or other deformation. The foamed layer preferably has a surface weight from 100 gsm to 600 gsm, more preferably from 200 gsm to 400 gsm and most preferably from 250 gsm to 300 gsm. Preferably, the non-inhibited foamed layer has a thickness from 0.17 mm to 1.10 mm.

Chemical Embossing:

The upper surface of the foamable layer is digitally printed with a material ("digitally printed material") containing an agent which inhibits foaming ("foam inhibiting agent"). The digitally printed material comprising the foam inhibiting agent is preferably printed by inkjet printing.

"Digital printing" herein refers to a method of printing from a digital-based image or pattern directly to a substrate. Examples of digital printing techniques include inkjet printing and laser printing.

"Inkjet printing" is a digital printing technique known in the art that recreates a digital image or pattern by propelling droplets of a material, typically a colorant, for example an ink, onto a substrate. Typically print heads using e.g. piezoelectric crystals are used to eject the droplets out of the nozzle orifice on to the substrate. Generally, there are two main technologies in use in contemporary inkjet printing processes: continuous (CU) and drop-on-demand (DOD).

The digital printing results in single or stacked dots of a material comprising foam inhibiting agent being deposited on the surface of the foamable material, with interstitial unprinted areas.

The foaming inhibiting agent then penetrates downwards into the foamable layer, and will counteract the development/expansion of the foam during thermal treatment. Areas of the foamable layer which have not been printed with the foam inhibiting agent or where no foam inhibiting agent has penetrated, are thus expanding normally upon thermal treatment, while expansion of the foamable material is suppressed or reduced in areas printed with the foam inhibiting agent, resulting in a surface with discontinuous chemically embossed relief pattern with indentations.

Figure 2:
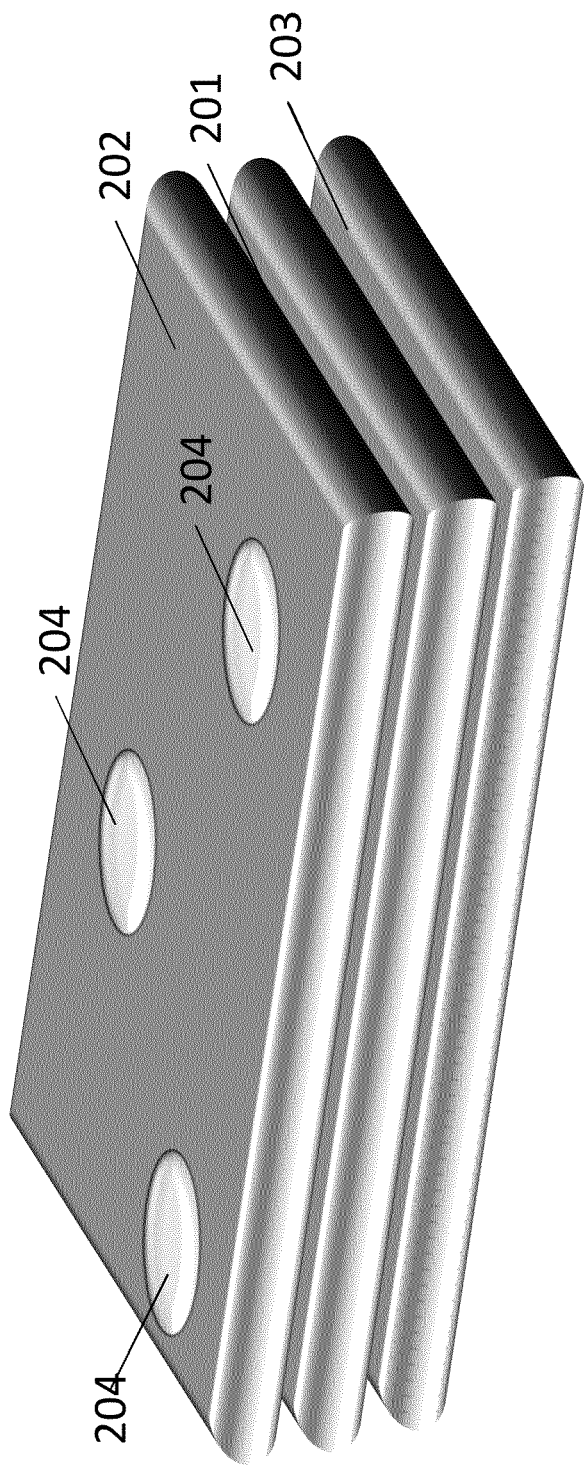
Figure 2:
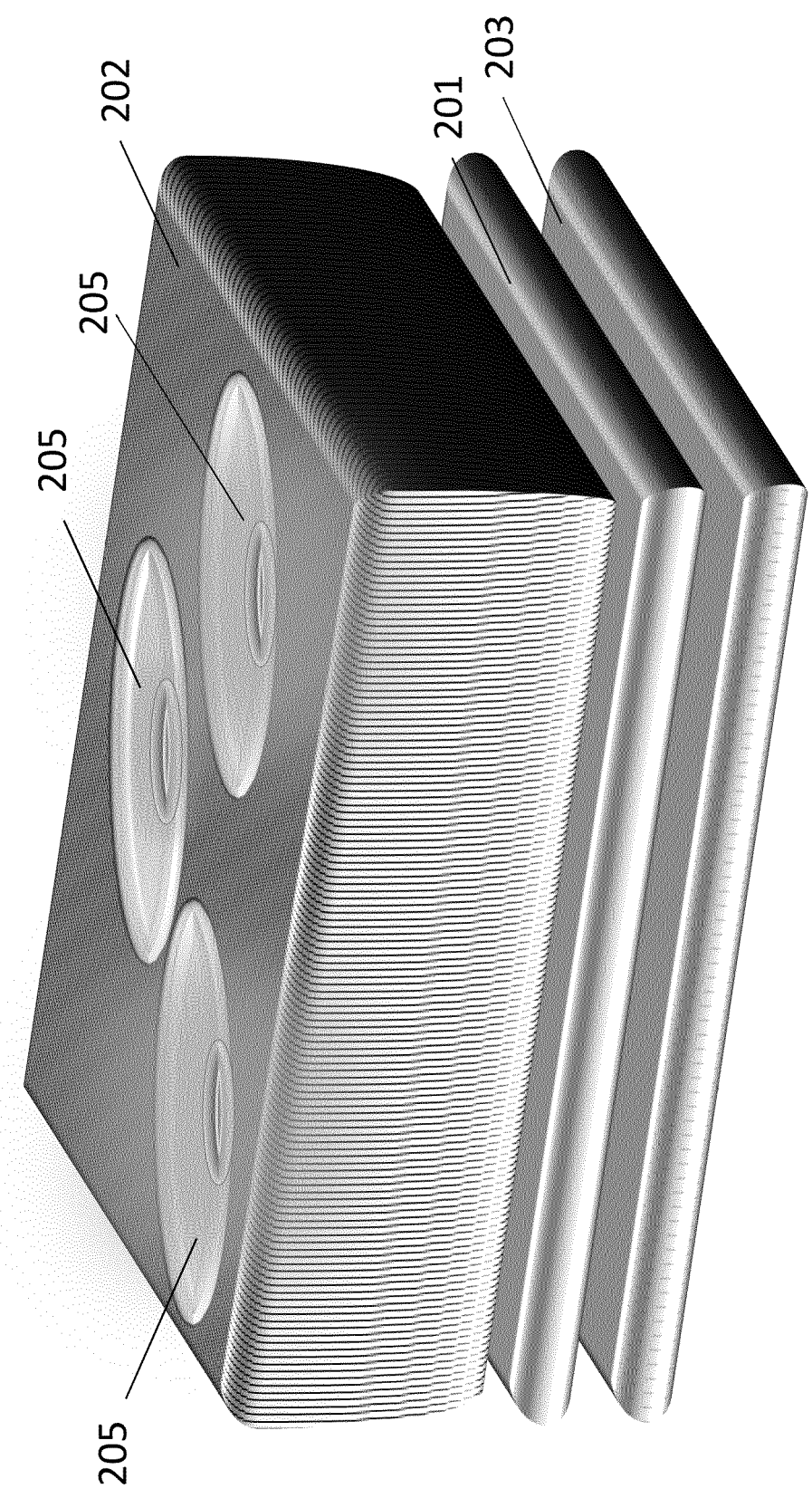

FIG. 2 (A) shows the inhibitor dots (204) on the foamable layer (202).

FIG. 2 (B) shows the effect after foaming: indentations (205) are formed where the inhibitor was printed, with a shape as defined by the penetration of the inhibitor into the foamable layer. Consecutive passes of printing will layer or stack dots on top of each other. Stacking of the dots has the advantage that locally, higher amounts of inhibitor can be printed, resulting in deeper indentations after foam expansion. Also a depth differentiation can be created by varying the number of dots stacked. Hence, embossing patterns with a very high resolution can be created.

See for instance FIG. 3A, wherein a single pass of a digitally printed surface is shown, whereas in FIGS. 3 B to D, 2, 4 and 8 passes are shown with the stacked dots.

The effectiveness of inhibition depends on the permeability, solubility and diffusion speed and distance of the foam inhibiting agent into the foamable layer. A wide range of compounds may be employed to act as inhibitors for chemical embossing of foamable layers in floor and wall covering surfaces. The choice of an inhibiting agent for the blowing agent and kicker will depend on the particular blowing agent utilized in the foamable layer. Triazole compounds such as benzotriazole (BTA), tolyltriazole (TTA) and derivatives and/or combinations thereof can conveniently be used as a foam inhibiting agent for the chemical embossing of a foamable material comprising azodicarbonamide as blowing agent, and ZnO as kicker. A preferred foam inhibiting agent is 1H-Benzotriazole-1-methanamine, N,N-bis(2-ethylhexyl)-ar-methyl (CAS 94270-86-7).

The foam inhibiting agent is preferably present in a, preferably liquid, carrier which allows better control of the amount of inhibitor to be applied. Preferably, the foam inhibiting agent is present in the carrier at a concentration of from 1 to 20 wt. %, of total weight of the carrier, based on solid matter, more preferably in an amount of from 7 to 15 wt %, and again more preferably of from 9 to 12 wt %.

While the material comprising the foaming inhibitor may be a physically drying or thermoplastic material, it preferably may comprise a binder material that allows at least a partial cure after printing the dots, to avoid that the dots spread out and to permit deposition of additional (stacked) dots directly thereafter, while at the same time reducing possible defects. More preferably the binder material is radiation-curable, preferably UV-curable. Accordingly, the present invention also relates to a sheet or substrate, wherein the digitally printed material comprises a radiation-curable binder material and the foam inhibiting agent.

In order to obtain high flexibility and good adhesion, the binder material preferably comprises an acrylate. Preferably, the acrylate comprises isobornyl acrylate (CAS 5888-33-5), dipropylene glycol diacrylate (CAS 57472-68-1), or combinations thereof. More preferably, the digitally printed material comprises of from 10 to 30 wt. % of isobornyl acrylate, and of from 5 to 20 wt. % dipropylene glycol diacrylate.

The curable binder material is at least partially cured, e.g. using UV light preferably within 5 seconds after contact with the foamable layer, which will prevent defects or flow outs, while still permitting penetration of the inhibitor agent into the foamable layer.

The digitally printed material may further comprise a UV-initiator, preferably in an amount of from 1 to 10 wt. %, based on total weight of the digitally printed material. A highly preferred UV-initiator is Trimethylbenzoyldiphenyl Phosphine Oxide (TPO), known under CAS 75980-60-8.

In any case, whether the foam inhibiting material is cured or physically dried, it was found that the foam inhibiting material penetrates into the foamable layer after printing, as evidenced by the indentations formed upon foam expansion at locations where dots of digitally printed inhibitor material had been deposited. Further, a particular advantage of the subject invention resides in the fact that several dots of inhibitor material can be printed on the same location, resulting for instance in a higher local amount of inhibitor in the foamable layer, and hence a stronger reduction of foam formation. By stacking the printed inhibitor, higher height differences in the relief can be achieved at very specific locations, allowing for instance for a more natural appearance of the decor of e.g. pronounced wooden or porous stone images.

Yet further, the amount needed to achieve maximum height difference is lower than with conventional (rotogravure) printing, thereby reducing the total amount of foam inhibiting agent required. At the same time, the resolution of the chemically embossed areas could be increased commensurate to the resolution of the digital printing technique. The resolution of the chemical embossed or embossing pattern is preferably in the range of from 100 to 1200 DPI, more preferably of from 300 to 1000 DPI even more preferably between 360 and 600 dpi.

The digitally printed material containing the foam inhibiting agent may optionally comprise ink (containing pigment(s) or dyes). In a preferred embodiment, the digitally printed material containing the foam inhibiting agent is free from ink.

The digital printing of a foam inhibiting agent allows the location and depth of the chemical embossing to be chosen independently from the application of a decorative pattern. Hence, the designer may achieve a hitherto unknown design freedom, allowing to create previously unachievable gradients and structures, with an unprecedented resolution of both the relief, as well as the decor applied thereto. Yet further, the relief of the resilient foamed layer after foam expansion may be designed to mirror complex patterns, while reducing or even avoiding repetition. A further advantage resides in the fact that the decorative image and the chemically embossed surface pattern are effectively uncoupled and can be defined independently.

The use of digital printing techniques for the deposition of the discontinuous chemical embossing pattern allows a higher degree of flexibility for the application of decorative images, herein referred to as "decorative layer" that can be applied on the upper surface of the foamable layer as compared to analogue printing techniques.

Moreover, naturally occurring images may be scanned using an optical and/or laser scanning system and uploaded in a database, thereby also taking into account the surface structure. The structure and image can then be further processed using image processing software, which may then be respectively applied as a chemically embossing pattern and a decorative layer to the top surface of the foamable layer using a digital printing technique. The devices used for the digital printing, for example an inkjet printer, may then be provided with a software that contains a database comprising, for example, different types of wood or stone patterns and surface structures, or any other decor designs.

Decorative Layer (105):

The decorative layer may be printed using inks containing pigments or dyes. This may be done using conventional printing techniques, such as rotogravure printing. Alternatively, part or all of the decorative layer may be printed by digital printing processes. The chemical embossing pattern and the decorative layer may also be printed intermittently.

The decorative layer preferably comprises continuously or discontinuously deposited ink forming a decorative image. More preferably, the decorative layer comprises digitally printed dots of ink forming a decorative image, preferably of with a resolution in the range of from 100 to 4800 DPI, preferably in the same or higher resolution than the chemical embossing pattern.

Preferably, a digital printing process is employed for the decorative layer, preferably using so-called black, cyan, magenta and yellow inks.

In a preferred embodiment, the decorative layer is printed using inkjet printing. Preferably, radiation curable, more preferably UV-curable inks are used whereby said UV-curable ink is at least partially cured using UV light shortly (preferably within 5 seconds) after printing.

It was found that inhibitor dots printed under the decorative layer resulted in sharper patterns, whereas inhibitor dots printed over the decorative layer resulted in softer patterns. The ink is preferably directly cured after the deposition by printing, i.e. within 5 seconds or less.

The inks employed in the present process may be any suitable digitally printable inks, as long as they are compatible with the foam inhibiting agent and the foamable layer. The ink typically includes a liquid vehicle and one or more solids, such as dyes or pigments and polymers.

UV-curable inkjet printable inks were found to be particularly useful. The ink preferably comprises one or more photo-initiators in a suitable amount and suitable decomposition absorption spectrum. In the present process, any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-410 nm, more preferably an ultraviolet LED. Yet more specifically, a UV-A light source, more preferably a UV-A LED is preferred due to the reduced light scattering therewith resulting in more efficient interior curing.

Applicants found that by separately printing an inhibiting agent, independently from the ink, a foam expanded relief could be achieved independently from the printed image.

Moreover, it was found that ink dots with a certain pigmentation and frequency of dots at a certain area, combined with independently printed inhibitor agent dots, allowed to achieve a stronger effect on the reduction of foam expansion as compared to solely printed inhibitor agent dots.

In particular a digitally printed UV-curing foam expansion inhibitor may advantageously be applied in the necessary amount and activity to result in a maximum inhibition effect, for instance in the order of 0.25 to 0.3 mm depth.

Wear Resistant Layer (106):

In a preferred embodiment, a wear resistant layer is provided over the decorative layer and/or the chemically embossed relief pattern. Preferably, the wear resistant layer is provided over the major surface of the decorative layer, and more preferably over the entire surface of the decorative layer. The wear resistant layer may comprise any suitable material known in the art, such as a polymeric film or a plastisol coating. In one embodiment, the wear resistant layer comprises one or more layers of a polymeric material, such as a thermoplastic and/or thermoset material. In one embodiment, the wear resistant layer comprises a transparent polyvinyl chloride layer. Other examples of the wear resistant layer include, but are not limited to, acrylic polymers, polyolefins, and the like. The wear resistant layer is however at least translucent, and preferably transparent. The wear resistant layer has a thickness of 100 µm to 700 µm.

Surprisingly, the adhesion of the wear resistant layer to the remainder of the multi-layer substrate may be better with digitally printed foam inhibiting agent as compared to conventionally printed chemical inhibitor. Preferably, the substrate exhibits a peel strength between the decorative layer and the wear resistant layer between 40 to 100 N/50 mm, more preferably of from 45 to 95 N/50 mm, and most preferably, of from 50 to 90 N/50 mm, when measured for complete product build-up including a wear resistant layer and determined according to EN 431:1994.

Top Coat or Lacquer (107):

A finishing top coat or lacquer may be provided onto the top surface of the wear resistant layer. They allow for an improved scratch resistance and determine the gloss of the final panel. The top coat or lacquer may be a polyurethane or an acrylic polymeric layer.

Backing Layer (101):

A backing layer may be provided adjacent and adhered to the lower surface of the support layer. Preferably, said backing layer comprises a synthetic material, preferably a vinyl-based polymer such as polyvinyl chloride. In a preferred embodiment, said backing layer comprises a synthetic foam material, and more specific a resilient, soft foam material such as soft polyvinyl chloride. Preferably, said soft polyvinyl chloride foam material has a surface weight between 200 gsm and 1800 gsm, more preferably between 300 gsm and 1300 gsm. Preferably, said soft polyvinyl chloride foam material has a thickness between 0.2 mm to 3.0 mm, more preferably between 0.3 mm to 2.0 mm. Said backing layer may further comprise reinforcement fibres such as glass fibres or polyester fibres, preferably in an amount of 1 wt. % to 20 wt. %, based on the total weight of said backing layer, and more preferably, in an amount of 2 wt. % to 5 wt. %.

Floor or Wall Panel:

In a third aspect, the present invention relates to a floor or wall panel wherein the foregoing substrate is applied as a top layer and adhered to a base panel.

The base panel can have or be dimensioned to any suitable length and/or width and can be provided in any shape, such as a rounded shape and a polygonal shape (triangle, rectangle, square, pentagon, hexagon, heptagon or octagon). The base panel can be provided in the shape of a rectangle, with short sides having a width of from 10 cm to 50 cm, preferably from 10 cm to 30 cm, and long sides having a length of from 50 cm to 300 cm, preferably from 80 cm to 250 cm. The base panel can also be provided in the shape of a square (tile) with a side length of from 20 cm to 100 cm, preferably from 25 cm to 80 cm, more preferably from 30 cm to 60 cm. Accordingly, the multi-layer substrate of the present invention is to be cut in the appropriate dimensions so as to perfectly fit as a top layer on the base panel.

The base panel may be wood-based (e.g. a fiberboard (MDF, HDF) or a particle board), or may comprise at least one layer of a wood-based material.

The substrate may also be made of, or at least comprising a layer of, synthetic material (as described hereinbefore) and optionally a filler material, and which may optionally be foamed. A synthetic material compound used to form the base panel can be a PVC powder compound that has good impact strength, ease of processing, high extrusion rate, good surface properties, excellent dimensional stability and indentation resistance.

The base panel may also comprise composite materials, or one or more layers thereof, such as wood-plastic composites (WPC), referring to a composite structure comprising a wood-based material and a synthetic material, which optionally may be foamed.

The base panel may comprise interlocking means for mechanically joining adjacent floor or wall panels. Locking systems have been widely used for many years and are well known to the artisan. Most popular locking systems are glueless locking systems where both horizontal and vertical locking of the panels are realized with a tongue along one (edge) side and a groove along the opposite (edge) side of the panel. Typically tongue and groove locking systems are integrally made with the panel. An alternative locking system comprises a plurality of staggered hooking tongues, extending outwardly from the edges of the panel. Such a system is for example described in European patent application number 14164155.5, assigned to BerryAlloc NV.

Process:

The present invention also relates to a process of preparing the substrate or a sheet, comprising the steps of:

a) providing a support layer having an upper surface and a lower surface; and b) adhering a foamable layer to the upper surface of the support layer; and c) applying a discontinuous chemical embossing pattern comprising single or stacked dots of a digitally printed material comprising a foam inhibiting agent on the upper surface of the foamable layer, and optionally, d) applying a decorative layer to the upper surface of the foamable layer comprising the chemical embossing pattern.

The present process allows various variations of the way the inhibitor may be printed:

It may for instance be printed in a separate operation onto the foamable layer. This may then be followed by a conventional build-up of decorative layer by normal printing processes. Advantageously, however, part or all of the decoration may also be printed digitally, preferably by using different print heads for inhibitor and pigmented ink in a combined or single print operation. In this case the inhibitor may be printed in the same printing operation with the decor layer, resulting in a digitally printed discontinuous layer comprising both the image as well as the chemical embossing pattern.

Inkjet printing is preferably used for the printing of the chemical embossing pattern as well as the decorative layer. A print head comprising the foam inhibiting agent is preferably combined with other print heads comprising only ink in an array of print heads, and wherein the foam inhibiting agent and the inks are digitally printed as part of a single printing operation. The foam inhibiting agent may be printed above, underneath, alongside and/or between the ink dots. The inkjet printing head normally scans back and forth in a transversal direction across the surface of the foamable layer. It is allowed that the inkjet print head does not print on the way back, but bi-directional printing is preferred for obtaining a high areal throughput. A preferred printing method is a "single pass printing process", which can be performed by using a substrate-wide array of inkjet printing heads or multiple staggered inkjet printing heads which cover the entire width of the surface. In a single pass printing process, the inkjet printing heads usually remain stationary and the printable surface is continuously transported under the inkjet printing heads.

The digitally printed material preferably comprises a radiation-curable binder material, the foam inhibiting agent and optionally a radiation-curable ink; and curing within 5 seconds after printing thereof. Preferably, the decorative layer is at least partially formed by digitally printing dots of radiation-curable ink, and curing within 5 seconds after printing thereof. Curing is preferably performed using UV-light, more preferably LED-UV.

Foaming of the foamable layer is initiated through thermal treatment at earliest after deposition and at least partially curing of the foam inhibiting agent and the decorative layer. Preferably, the foaming is performed at the end of the process before top coat or Lacquer (107) are applied.

An exemplary process is described below:

A continuous glass fibre mat (102) is fed into a coating line.

At the impregnation station, the glass mat is saturated with a PVC composition, which is subsequently gelified by heating.

In the next station, a foamable PVC layer is applied by knife over roll process and subsequently gelified by heating. The thus prepared sheet-like material may then be taken up on a take up roll, or the process directly continued.

In a separate, or in-line operation, the said sheet-like material system is fed through a printing line where at a first station an inhibition material in a discontinuous pattern is applied by digital printing on to the foamable layer.

In the printing line a decorative pattern is further printed on the sheet-like material by means of an array of digital print heads.

The printed patterns are cured by means of a UV lamp, yielding the substrate (as described in claim 2)

In a further separate coating step of the process a clear wear resistant layer (106) is applied to the foamable layer by coating and subsequent gelling through heating.

Also, a backing layer (101) may be applied by coating.

Then, in an oven, which is heated to 190° C. the final gelification of each layer occurs and the foamable layers expand, thereby creating the chemically embossed relief pattern, yielding a sheet (100) as claimed in claim 1.

Preferably, in the process, a dedicated print head for applying the foam inhibiting agent is combined with other print heads applying only ink in an array of print heads. Herein, the foam inhibiting agent and the inks are digitally printed as part of a single printing operation.

The present invention further also relates to a system for performing the digital printing process. The system preferably comprises a server; a database, operatively connected to the server and configured to store one or more patterns for deposition of foam inhibitor agent to form a chemical embossing layer; a module, operatively connected to the server, for uploading one or more customized patterns and for storing the patterns in the database; a digital printer, operatively connected to the server, configured to print the one or more customized pattern(s) for the chemical embossing of the foamable layer.

The invention claimed is:

1. A multi-layered sheet floorcovering exhibiting a three-dimensional surface relief and a decorative image, comprising:

i. a support layer having an upper surface and a lower surface, wherein the support layer comprises at least one reinforcement layer;

ii. a foamed layer having an upper surface and a lower surface, the lower surface of the foamed layer provided adjacent, and adherent to the upper surface of the support layer, the upper surface of the foamed layer comprising a discontinuous chemically embossed relief pattern, wherein the discontinuous chemically embossed relief pattern comprises indentations formed by stacked dots of a digitally printed material comprising a radiation-curable binder material and a foam inhibiting agent;

iii. a printed decorative layer adhered to the upper surface of the foamed layer;

iv. at least one wear resistant layer provided adjacent and adhered to the decorative layer, wherein the wear resistant layer comprises a transparent polyvinyl chloride layer, wherein a peel strength is exhibited between the decorative layer and the wear resistant layer between 40 to 100 N/50 mm, when measured for complete product build-up including the wear resistant layer and determined according to EN 431:1994; and optionally v. a backing layer provided adjacent and adhered to the lower surface of the support layer.

2. The multi-layer sheet according to claim 1, wherein the at least one reinforcement layer comprises a woven or non-woven layer impregnated with a synthetic material.

3. The multi-layered sheet according to claim 1, wherein the binder material comprises an acrylate.

4. The multi-layered sheet according to claim 1, wherein the foam inhibiting agent is present in the digitally printed material at a concentration of 1 to 20 wt. % by weight of the digitally printed material.

5. The multi-layered sheet according to claim 1, wherein the digitally printed material comprises an ink, or wherein the digitally printed material is free from ink.

6. The multi-layer sheet according to claim 1, wherein the decorative layer comprises continuously or discontinuously deposited ink forming the decorative image.

7. The multi-layer sheet according to claim 6, wherein the decorative layer comprises digitally printed dots of ink forming the decorative image.

8. The multi-layered sheet according to claim 7, wherein the ink is a radiation-curable ink.

9. The multi-layered sheet according to claim 1, wherein the resolution of the chemical embossed relief pattern is in the range of from 100 to 1200 DPI.

10. The multi-layered sheet according to claim 9, wherein the resolution of the chemical embossed relief pattern is in the range of from 400 to 800 DPI.

11. A floor panel comprising:
    i. a base panel; and
    ii. a sheet according to claim 1 as a top layer adjacent and adhered to the base panel.

12. A multi-layered sheet-like substrate suitable for being processed into a multi-layered sheet floor covering exhibiting a three-dimensional surface relief and having a decorative image, comprising:
    i. a support layer having an upper surface and a lower surface, wherein the support layer comprises at least one reinforcement layer;
    ii. a foamable layer having an upper surface and a lower surface, the lower surface of the foamable layer provided adjacent and adherent to the upper surface of the support layer
    iii. a discontinuous chemical embossing pattern comprising stacked dots of a digitally printed material comprising a radiation-curable binder material and a foam inhibiting agent, wherein upon being processed the foamable layer is converted to a foamed layer, an upper surface of the foamed layer comprising a discontinuous chemically embossed relief pattern comprising indentations formed by the stacked dots of the digitally printed material;
    iv. a printed decorative layer adhered to the upper surface of the foamable layer; and
    v. at least one wear resistant layer provided adjacent to and adhered to the decorative layer, wherein the wear resistant layer comprises a transparent polyvinyl chloride layer, wherein a peel strength is exhibited between the decorative layer and the wear resistant layer between 40 to 100 N/50 mm, when measured for complete product build-up including the wear resistant layer and determined according to EN 431:1994; and optionally
    vi. a backing layer provided adjacent and adhered to the lower surface of the support layer.

13. The multi-layered sheet-like substrate according to claim 12, wherein the binder material comprises an acrylate.

14. The multi-layered sheet-like substrate according to claim 12, wherein the foam inhibiting agent is present in the digitally printed material at a concentration of 1 to 20 wt. % by weight of the digitally printed material.

15. The multi-layered sheet-like substrate according to claim 12, wherein the digitally printed material comprises an ink, or wherein the digitally printed material is free from ink.

16. The multi-layered sheet-like substrate according to claim 12, wherein the decorative layer comprises continuously or discontinuously deposited ink forming the decorative image.

17. The multi-layered sheet-like substrate according to claim 16, wherein the decorative layer comprises digitally printed dots of ink forming the decorative image.

18. The multi-layered sheet-like substrate according to claim 17, wherein the ink is a radiation-curable ink.

19. The multi-layered sheet-like substrate according to claim 12, wherein the resolution of the chemical embossing relief pattern is in the range of from 100 to 1200 DPI.

20. The multi-layered sheet-like substrate according to claim 19, wherein the resolution of the chemical embossing relief pattern is in the range of from 400 to 800 DPI.

21. A process of preparing a multi-layered sheet floor covering according to claim 1, comprising the steps of:
    i. providing the support layer having the upper and the lower surface;
    ii. adhering a foamable layer to the upper surface of the support layer;
    iii. applying a discontinuous chemical embossing pattern comprising stacked dots of the digitally printed material on an upper surface of the foamable layer;
    iv. applying the decorative layer to the upper surface of the foamable layer comprising the chemical embossing pattern; and
    v. applying the at least one wear resistant layer provided adjacent and adhered to the decorative layer; and optionally
    vi. applying the backing layer provided adjacent and adhered to the lower surface of the support layer.

22. The process according to claim 21, wherein applying the decorative layer comprises continuously or discontinuously depositing ink to form the decorative image.

23. The process according to claim 21, wherein continuously or discontinuously depositing ink comprises digitally printing dots of ink.

24. The process according to claim 21, wherein the digitally printed material comprises the radiation-curable binder material, the foam inhibiting agent, and optionally a radiation-curable ink; and curing within 5 seconds after printing thereof.

25. The process according to claim 23, wherein digitally printing dots of ink comprises radiation-curable ink, and curing within 5 seconds after printing thereof.

26. The process according to claim 25, wherein a print head comprising the foam inhibiting agent is combined with other print heads comprising only ink in an array of print heads, and wherein the foam inhibiting agent and the inks are digitally printed as part of a single printing operation.

27. The process according to claim 21, further comprising a step of converting the foamable layer to the foamed layer, wherein the upper surface of the foamed layer comprises the discontinuous chemically embossed relief pattern comprising indentations formed by the stacked dots of the digitally printed material.

28. The process according to claim 21 using a system, the system comprising:
   i. a server;
   ii. a database, operatively connected to the server and configured to store one or more patterns for deposition of the foam inhibitor inhibiting agent to form the chemically embossed relief pattern;
   iii. a module, operatively connected to the server, for uploading one or more customized patterns and for storing the patterns in the database; and
   iv. a digital printer, operatively connected to the server, configured to print the one or more customized patterns for chemically embossing of the foamable layer.

* * * * *

UNITED STATES PATENT AND TRADEMARK OFFICE
CERTIFICATE OF CORRECTION

PATENT NO. : 11,345,116 B2
APPLICATION NO. : 16/318748
DATED : May 31, 2022
INVENTOR(S) : Jonas Guido Feys et al.

It is certified that error appears in the above-identified patent and that said Letters Patent is hereby corrected as shown below:

In the Claims

In Column 12, Line 44, In Claim 1, replace "floorcovering" with "floor covering.".

In Column 13, Line 47, In Claim 12, add a --;-- to the end of the paragraph ii.

Signed and Sealed this
Twenty-fifth Day of June, 2024

Katherine Kelly Vidal
*Director of the United States Patent and Trademark Office*